US012536283B2

United States Patent
Alsharif et al.

(10) Patent No.: US 12,536,283 B2
(45) Date of Patent: Jan. 27, 2026

(54) MULTI-LAYERED MACHINE LEARNING MODEL AND USE THEREOF

(71) Applicant: SAUDI ARABIAN OIL COMPANY, Dhahran (SA)

(72) Inventors: Sultan Saadaldean Alsharif, Dhahran (SA); Nada Essa Al-Noaimi, Dhahran (SA); Nora A. Algarawi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 370 days.

(21) Appl. No.: 18/054,064

(22) Filed: Nov. 9, 2022

(65) Prior Publication Data

US 2024/0152614 A1    May 9, 2024

(51) Int. Cl.
  G06F 21/56    (2013.01)
  G06N 20/00    (2019.01)

(52) U.S. Cl.
  CPC .......... G06F 21/566 (2013.01); G06F 21/561 (2013.01); G06N 20/00 (2019.01)

(58) Field of Classification Search
  CPC ..... G06F 21/561; G06F 21/566; G06N 20/00; G06N 20/20
  See application file for complete search history.

(56) References Cited

U.S. PATENT DOCUMENTS

| | | | |
|---|---|---|---|
| 2017/0357760 A1 | 12/2017 | Han et al. | |
| 2019/0318100 A1* | 10/2019 | Bhatia | G06F 21/57 |
| 2020/0184284 A1* | 6/2020 | Lim | G06N 3/045 |
| 2021/0110439 A1 | 4/2021 | Jayne et al. | |
| 2021/0287310 A1 | 9/2021 | Chongfuangprinya et al. | |
| 2021/0390426 A1 | 12/2021 | Nair | |
| 2022/0172021 A1* | 6/2022 | Hoang | G06N 3/04 |
| 2022/0293282 A1* | 9/2022 | Lee | G16H 50/80 |
| 2022/0301153 A1* | 9/2022 | Chen | G16H 70/60 |
| 2023/0360199 A1* | 11/2023 | Godden | A61B 5/7275 |
| 2023/0420128 A1* | 12/2023 | Gupta | G16H 30/40 |
| 2024/0070688 A1* | 2/2024 | Domeniconi | G06N 3/08 |

FOREIGN PATENT DOCUMENTS

| | | |
|---|---|---|
| CN | 110009109 A | 7/2019 |
| CN | 114091325 A | 2/2022 |
| EP | 3816879 A1 | 5/2021 |
| WO | 2018098598 A1 | 6/2018 |
| WO | 2018170028 A1 | 9/2018 |
| WO | 2018194960 A1 | 10/2018 |
| WO | 2019109743 A1 | 6/2019 |

* cited by examiner

Primary Examiner — Gil H. Lee
(74) Attorney, Agent, or Firm — Vorys, Sater, Seymour and Pease LLP

(57) ABSTRACT

Described herein is a prediction engine for aiding decision support. In some examples, the prediction engine can be used in aiding cyber security applications. The prediction engine can include multiple prediction layers that each include a number of machine learning models that contribute to an overall prediction of the prediction engine in predicting whether a respective system or system user poses a cyber-threat. The prediction engine can provide prediction data that can indicate that the respective system or system user is a cyber-threat. In some examples, a decision engine can be employed to use the prediction data to mitigate or eliminate the cyber-threat.

16 Claims, 5 Drawing Sheets

MULTI-LAYERED MACHINE LEARNING MODEL AND USE THEREOF

FIELD OF THE DISCLOSURE

This disclosure relates generally to machine learning (ML), and more particularly, to a multi-layered ML model for decision support.

BACKGROUND OF THE DISCLOSURE

ML is a field of inquiry devoted to understanding and building methods that learn, that is, methods that leverage data to improve performance on some set of tasks. ML is seen as a part of artificial intelligence. ML algorithms build a model based on sample data, known as training data, in order to make predictions or decisions without being explicitly programmed to do so. ML algorithms are used in a wide variety of applications, such as in medicine, email filtering, speech recognition, and computer vision.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment consistent with the present disclosure, a computer-implemented method can include receiving, at a prediction engine, behavioral data characterizing a behavior of one or more systems and/or system users, and predicting, at the prediction engine, whether any of the one or more systems or system users is a cyber-threat based on the behavioral data. The prediction engine can include multiple prediction layers that each include a number of ML models that can contribute to an overall prediction of whether any of the one or more systems or system users is the cyber-threat. The computer-implemented method can further include outputting, at the prediction engine, prediction data indicating that a respective system or system user is the cyber-threat for use in mitigating or eliminating the cyber-threat posed by the respective system or system user.

In another embodiment, a system can include memory to store machine-readable instructions that can include a prediction engine. The prediction engine can include an input prediction layer, an intermediary prediction layer, an output prediction layer, and aggregators. Each of the input prediction layer and the intermediary prediction layer can include ML models. The output prediction layer can include a respective ML model. The system further includes one or more processors to access the memory and execute the machine-readable instructions to receive, at each ML model of the ML models of the input prediction layer, respective input data from a different data source of data sources to provide respective first predictions, aggregate, at a first aggregator of the aggregators, the respective first predictions to provide a first aggregated prediction, receive, at each ML model of the ML models of the intermediate prediction layer, the first aggregated prediction to provide respective second predictions, aggregate, at a second aggregator of the aggregators, the respective second predictions to provide a second aggregated prediction, receive, at the respective ML model of the output prediction layer, the second aggregated prediction to provide a predicted outcome, and cause the predicted outcome to being used in a system to influence a decision process of the system.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
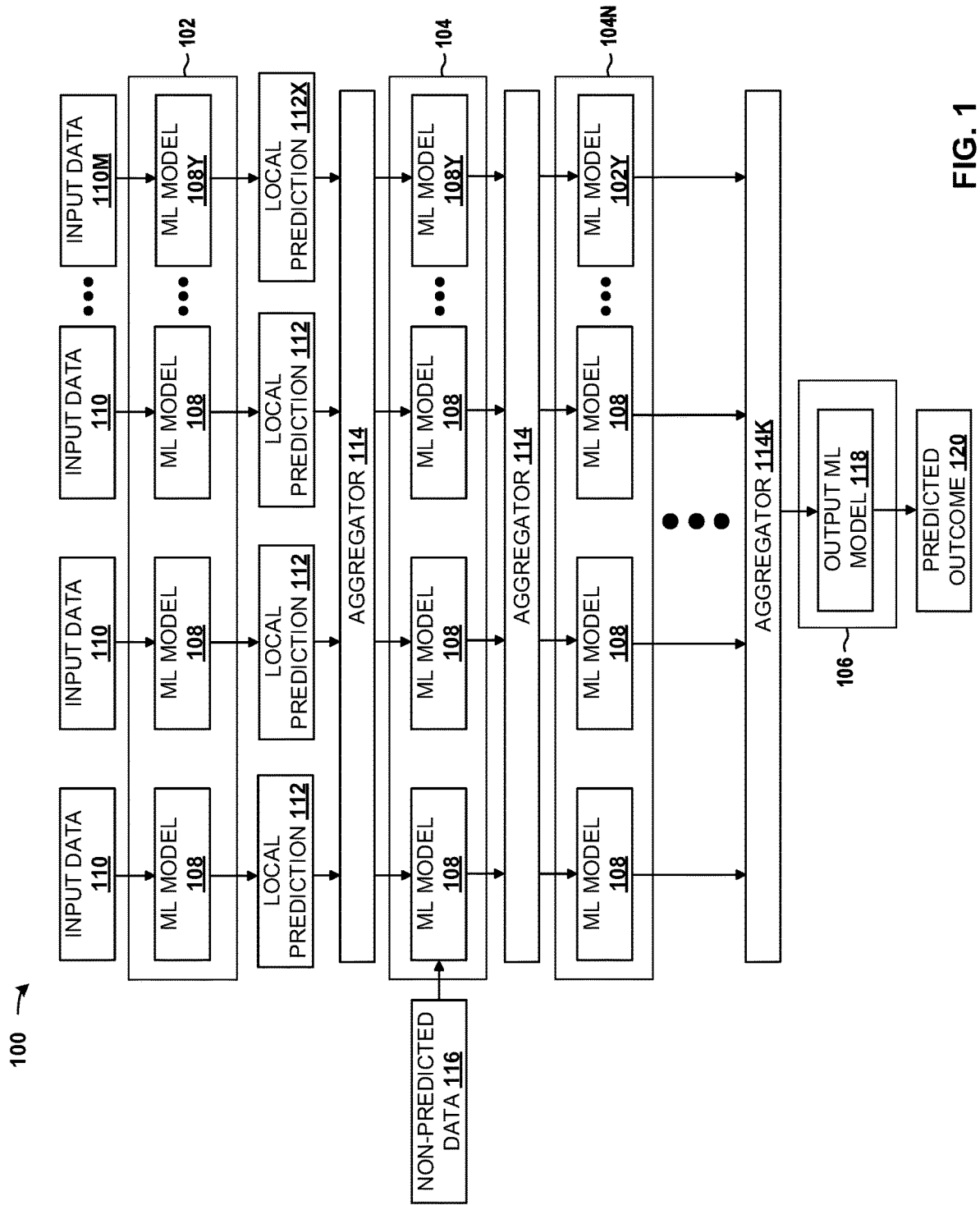
FIG. 1 is an example of a prediction engine.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

According to the examples herein, systems and methods are described that use a multi-layered ML algorithm, referred to herein, as a prediction engine. The prediction engine can be used to assists or aid a decision process. Examples are presented herein in which the prediction engine is used in a cybersecurity application to determine whether an entity is potentially under cyber-threat from an internal or external source. However, in other examples, the prediction engine can be used in other types of applications, and thus the examples herein should not be construed and/or limited to cybersecurity. The prediction engine includes multiple prediction layers. Each prediction layer of the multiple prediction layers of the prediction engine can include a number of ML models that contribute to an overall prediction of the prediction engine in predicting whether an entity system or entity user potentially poses a cyber-threat to an entity.

In some examples, the prediction engine can receive behavioral data characterizing a behavior of one or more entity systems and/or entity users of the entity. The behavioral data can include, for example, user behavior data, network traffic data, application behavior data, device behavior data, and/or computer behavior data. The prediction engine can predict whether any of the one or more entity systems or the entity users poses a potential cyber-threat to the entity. The prediction engine can output prediction data indicating that a respective entity system or entity user potentially poses a cyber-threat to the entity. In some examples, the prediction data can be used by a cyber-threat monitoring system, as described herein, to mitigate or eliminate the cyber-threat to the entity posed by the respective entity system or entity user.

FIG. 1 is an example of a prediction engine 100. The prediction engine 100 can be implemented using one or more modules, shown in block form in the drawings. The one or more modules can be in software or hardware form, or a combination thereof. In some examples, the prediction engine 100 is used in aiding or supporting a decision process. The prediction engine 100 can be tailored to a particular application, such as security, marketing, operations, risk, medicine, engineering, military operations, fraud detection, or any type of application or system for predicting outcomes for use in aiding a decision process. The term "outcome" and derivatives thereof, as used herein, can refer to a behavior, action, decision, change, update, event, pattern, relationship, or any value or variable representing or assigned to have a particular meaning in a given application. As an example, if the given application is image classification, the prediction engine 100 can be trained on relevant image classification training data to provide a value or variable indicative of a classification result (e.g., object identification, such as recognizing a face). Accordingly, while examples are presented herein wherein the prediction engine 100 is used for aiding decision processes of cyber-security applications, it is to be understood that the prediction engine 100 can be adapted (e.g., updated and trained based on relevant training data) for use in aiding a decision process of a different type of application.

Continuing with the example of FIG. 1, the prediction engine 100 can include a number of prediction layers, such as an input prediction layer 102, an N number of intermediary prediction layers 104-104N, wherein N is an integer value equal to or greater than one (1), and an output prediction layer 106. While the example of FIG. 1 illustrates two (2) intermediary prediction layers, in other examples, any number of intermediary prediction layers can be used. The number of intermediary predication layers can based on a needed granularity, accuracy, and/or application characteristics for a particular application in which the predication engine 100 is to be used.

Because the prediction engine 100 uses multiple prediction layers, the prediction engine 100 can provide more accurate prediction outcomes when compared to prediction engines that are not multi-layered. The prediction engine 100 breaks down (e.g., divides) a prediction into a subset of intermediary predictions. Each intermediary prediction of the subset of intermediary predictions can be used by a downstream prediction layer to make a further prediction that can be a factor of a number of upstream intermediary predictions. The output prediction layer 106 can provide a global prediction, which can correspond to an overall predicted outcome for the particular application. Thus, each prediction layer provides a number of local predictions and these local predictions drive (e.g., contribute to) one or more downstream predictions and thus influence the overall predicted outcome provided by the output prediction layer 106 of the prediction engine 100.

Accordingly, the prediction engine 100 can divide a prediction problem (e.g., whether a user or a system is a potential cyber-threat) into a smaller set of predictions problems (e.g., whether the user's browsing habits, internet search history, social media activity, and/or the like is an indication that the user or the system poses a potential cyber-threat). The prediction engine 100 solves local prediction problems, in some instances, relying on one or more previous predictions, from an upstream prediction layer, to provide an overall solution for the prediction problem (e.g., whether the user or the system is a potential cyber-threat to the entity).

Figure 3:
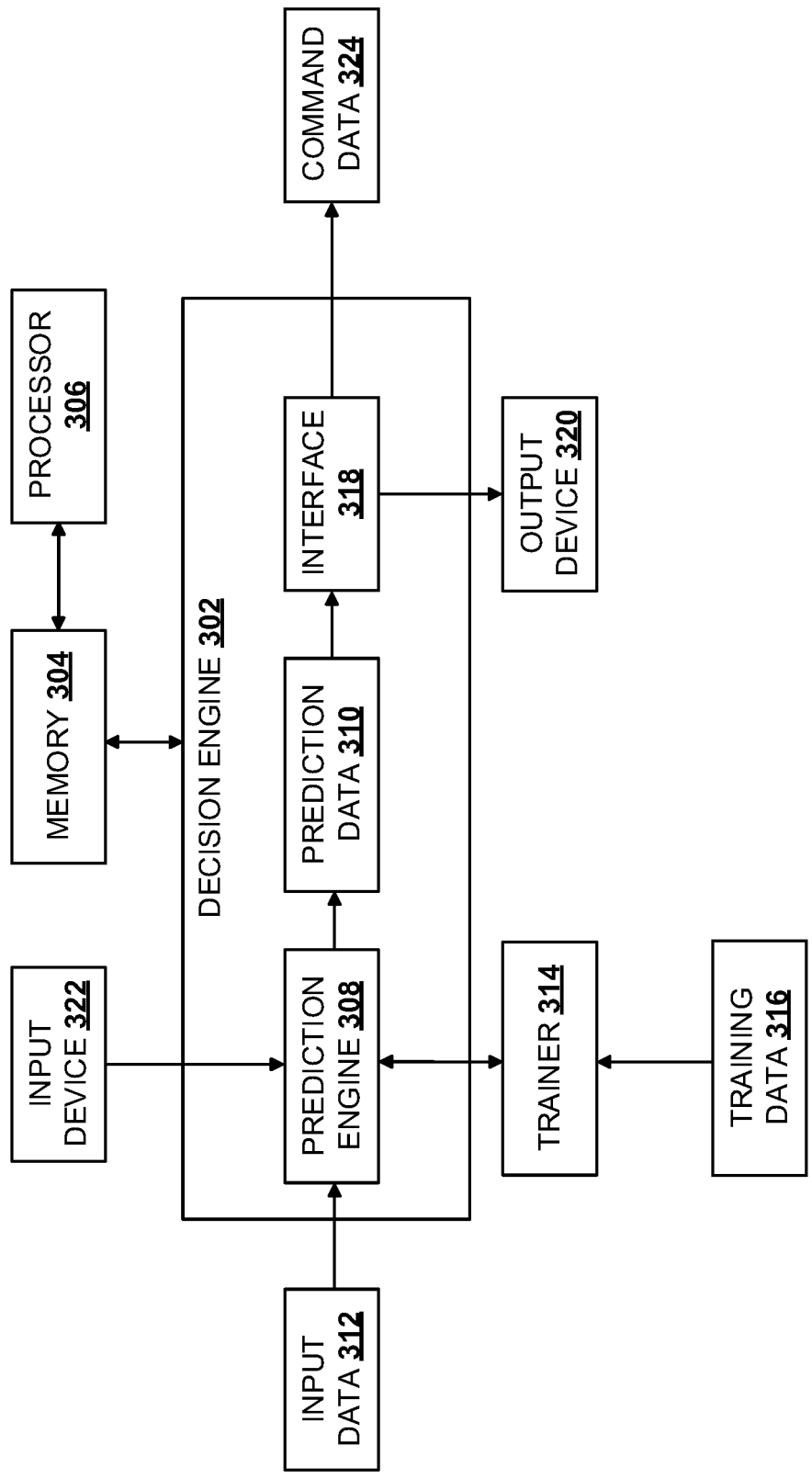
FIG. 3 is an example of a cyber-threat monitoring system.

Each of the input prediction layers 102 and the intermediary prediction layers 104-104N can include a Y number of ML models 108-108Y, wherein Y is an integer value equal to or greater than one (1), as shown in FIG. 1. The number of ML models 108-108Y at the input prediction layer 102 can be based on a number of input parameters, and thus data points to be considered or processed by the prediction engine 100. Each ML model of the ML models 108-108Y at each prediction layer 102 and 104-104N can be trained (e.g., by a trainer 314, as shown in FIG. 3) to provide an intermediary prediction, which contributes to or influences an overall prediction provided by the prediction engine 100.

The ML models 108-108Y at each prediction layer 102 and 104-104N can be similar or different types of ML models based on the particular application in which the prediction engine 100 is to be used. Example ML models that can be used by the prediction engine 100 can include a decision tree (e.g., a classification, regression tree, etc.), a regression (e.g., a linear or logistic regression), a neural network (e.g., a deep neural network, a convolution neural network, learning vector quantization, etc.), a time series algorithm, a clustering algorithm (e.g., a K-nearest neighbor algorithm, a K-means algorithm, etc.), ensemble learning (e.g., bagging, for example, with Random Forests, boosting, stacking, etc.), a Naïve Bayes classifier, linear discriminant analysis, and a support vector machine. The ML models 108 can be generated using a supervised, unsupervised, and/or a reinforced ML algorithm, or a different type of ML algorithm. Thus, in some examples, the prediction engine 100 can include any number of different ML models, and each prediction layer 102 and 104-104N can have at least one ML model that is different from at least one ML model of another prediction layer 102 and 104-104N.

Because the ML models 108-108Y of a downstream prediction layer process on one or more local predictions from an upstream prediction layer, in some examples, during ML model training, these ML models 108-108Y can be trained based on local predictions being provided by the upstream prediction layer, and/or an aggregated prediction from an upstream aggregator, such as described herein. In even further examples, the ML models 108-108Y of the downstream prediction layer can be trained based on the local predictions provided by the upstream prediction layer, the aggregated prediction from the upstream aggregator, and/or non-predicted data, for example, non-predicted data 116, as shown in FIG. 1. In some examples, the non-predicted data 116 can be referred to as an input variable.

The input prediction layer 102 can receive an M number of input data 110-110M, wherein M is an integer value greater than or equal to one (1). Each of the ML models 108-108Y of the input prediction layer 102 can receive one of the M number of input data 110-110M. In some instances, a respective ML model of the ML models 108-108Y can receive one or more different types of input data. Thus, the respective ML model can receive at least two of the M number of input data 110-110M. In some examples, each instance of input data 110-110M can be referred to an input variable. Each of the ML models 108-108Y of the input prediction layer 102 can process one of the M number of input data 110-110M to provide an L number of local predictions 112, also referred to herein as intermediary prediction, wherein L is an integer value greater than or equal to one (1). The input data 110-110M can be from a number of different data sources of the particular application in which the prediction engine 100 can be used. As an example, the different data sources can be sensors, network devices, computer or device monitoring software, etc.

The decision engine 100 includes a K number of aggregators 114-114K, wherein K is an integer value greater than or equal to one (1). A first aggregator of the aggregators 114-114K can be located between the input prediction layer 102 and a first intermediary prediction layer 104 and a last aggregator of the aggregators 114-114K can be located between a last intermediary prediction layer 104N and the output prediction layer 106. Remaining aggregators of the aggregators 114-114K can be located between neighboring intermediary predictions layers 104 downstream from the first intermediary prediction layer 104. Each aggregator 114 can aggregate outputs from ML models 108-108Y from an upstream prediction layer and provide an aggregated local prediction to each ML model 108-108Y of the downstream prediction layer. The aggregated local prediction can include one or more local predictions 112 from the upstream prediction layer. In some examples, the aggregated local prediction can be a dataset, a vector, or a table that includes the one or more local predictions 112 from the upstream prediction layer. In other examples, the aggregated local prediction is a function of the one or more local predictions 112. For example, the local predictions 112 can be added together to provide the aggregated local prediction.

In additional examples, one or more intermediary prediction layers 104-104N can receive the non-predicted data 116. Non-predicted data can refer to data that is not a prediction, such as a local prediction, and thus can be referred to as a real data set. The non-predicted data 116 can be provided to at least some or all of the ML models 108 of the one or more intermediary prediction layers 104-104N. Thus, in some examples, a respective ML model of the ML models 108-108Y of the one or more intermediary prediction layers 104-104N can provide a prediction based on the aggregated local prediction and the non-predicted data 116 to generate a local prediction.

In some examples, the input prediction layer 102 and a first aggregator can form or define (e.g., in memory, such as the memory described herein) a first prediction level ($L_1$). Each downstream intermediary prediction layer and downstream aggregator can form a respective prediction level ($L_{n-1}$), and a final aggregator and the output prediction layer 106 can form or define a final prediction level ($L_n$). At the first level, the first aggregator can process the local predictions 112-112L from the input prediction layer 102 and aggregate the local predictions 112-112L to provide the aggregated local prediction. At a downstream level, the downstream intermediary prediction layer can provide downstream local predictions, which can be aggregated by the downstream aggregator to provide a downstream aggregated local prediction for a subsequent level (e.g., a further downstream level). At the final level, the last aggregator 114 can aggregate the downstream local predictions to provide a final aggregated local prediction. The final aggregated local prediction can be provided to the output prediction layer 106.

The output prediction layer 106 can include an output ML module 118. The output ML module 118 can be implemented as a classifier. The output ML module 118 can be trained (e.g., by a trainer 314, as shown in FIG. 3) to provide a predicted outcome 120 (e.g., the user or the system potentially poses a cyber-threat). The predicted outcome 120 in some instances can be rendered on a display to alert personnel (e.g., an administrator, etc.) of the cyber-threat. In some examples, the predicted outcome 120 can be used in a decision system to support, facilitate, or influence a decision process, or a decision process of another system. The decision process can include machine or computer implemented decision processes, for example, adjusting network, computer, system, or device parameters, settings, or configurations.

For example, the decision system or the other system can disable or lockout a system or device accessible by the user based on the predicted outcome 120 indicating that the user is a potential cyber-threat. In some examples, the output prediction layer 106 can be integrated into the decision system or the other system, or communicate with the decision or other system. The ML model 118 can cause the decision or other system to disable or lockout the user system or device from being accessible, and thus thwart malicious activity on an entities computer network. In further examples, the decision or the other system can block or ban an internet protocol (IP) address of the user system or device from accessing the entities computer network.

Accordingly, the prediction engine 100 is a multi-layered ML algorithm that uses a number of prediction levels to reduce a complex prediction problem into a smaller subset of prediction problems. By reducing the complex prediction problem into a small subset of prediction problems allows for more accurate predictions as different data points can be considered in combination to provide a more accurate prediction.

Figure 2:
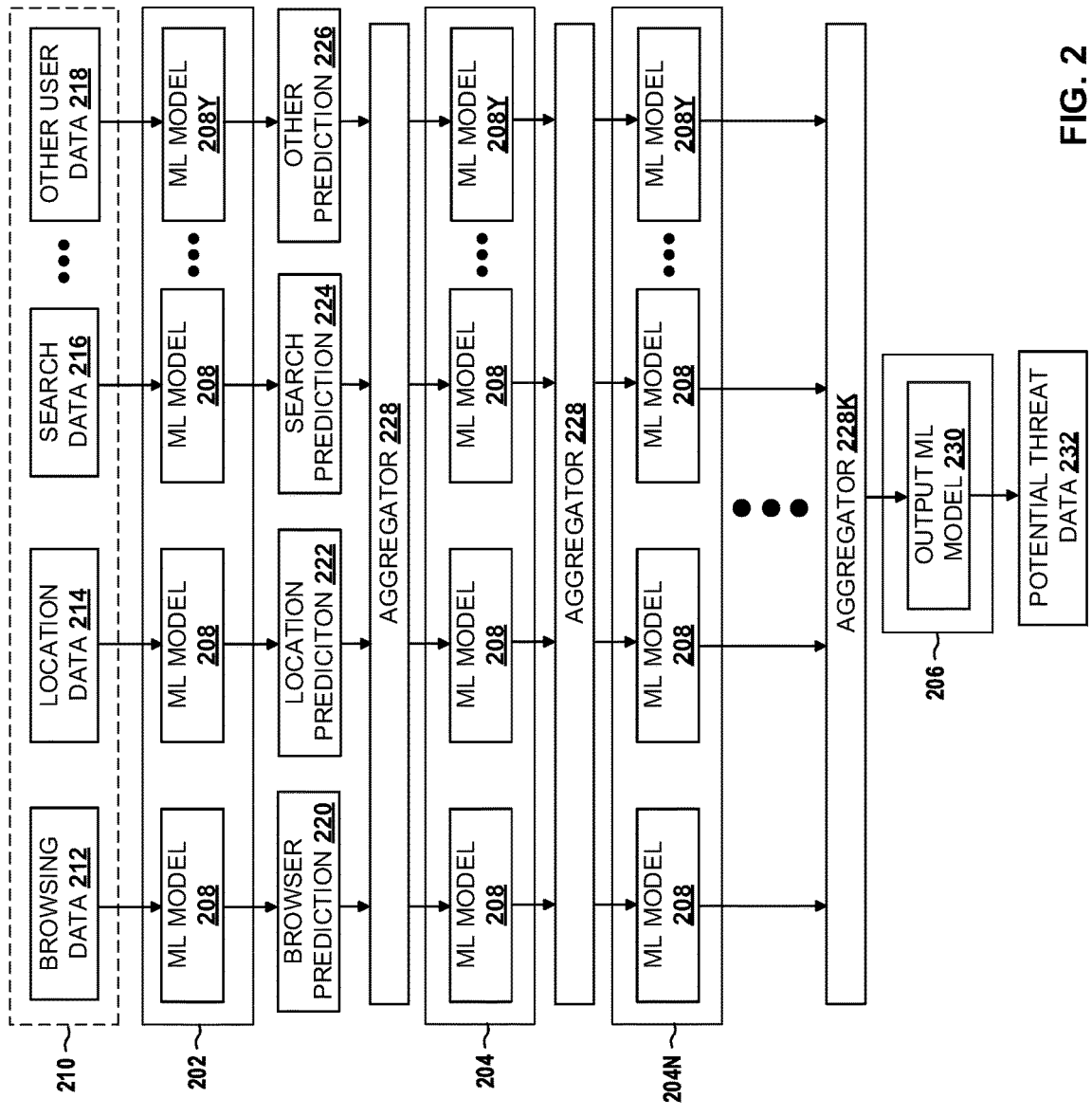
FIG. 2 is an example of another prediction engine.

FIG. 2 is an example of a threat prediction engine 200. The threat prediction engine 200 can be implemented using one or more modules, shown in block form in the drawings. The one or more modules can be in software or hardware form, or a combination thereof. The threat prediction engine 200 can be used to predict whether a user (e.g., an employee) of an entity (e.g., organization, school, etc.) poses a potential cyber-threat to the entity. The threat to the entity can include destruction or loss of entity data, or compromise of an entity system. The prediction engine 200 includes an input prediction layer 202, an N number of intermediary prediction layers 204-204N, wherein N is an integer value equal to or greater than one (1), and an output prediction layer 206. In some examples, the prediction layers 202, 204-204N, and 206 can be implemented similar to the prediction layers 102, 104-104N, and 106, as shown in FIG. 1. Thus, reference can be made to the example of FIG. 1 in the example of FIG. 2. While the example of FIG. 2 illustrates two (2) intermediary prediction layers 204, in other examples, any number of intermediary prediction layers may be used, for example, based on a number of data points available to an entity.

Each of the input prediction layer 202 and the intermediary prediction layers 204-204N can include a Y number of ML models 208-208Y, wherein Y is an integer value equal to or greater than one (1), as shown in FIG. 2. The number of ML models 208-208Y at the input prediction layer 202 can be based on a number of behavioral input parameters that is to be processed by the threat prediction engine 200, or data points available to the entity. Thus, a greater number of ML models 208-208Y at the input prediction layer 202 and/or intermediary prediction layers 204-204N allows the prediction engine 200 to consider a greater number of behavioral input parameters, which enables the threat prediction engine 200 to predict with more certainty (e.g., with a higher confidence) whether the user poses a potential cyber-threat to the entity. Each ML model of the ML models 208-208Y at each prediction layer 202 and 204-204N can be trained (e.g., by a trainer 314, as shown in FIG. 3) to provide an intermediary prediction. The ML models 208-208Y at each prediction layer 202 and 204-204N can be similar or different ML models, and can correspond to one of the ML models as described herein. The ML models 208-208Y can be trained in a same or similar manner as described herein with respect to the ML models 108-108Y of FIG. 1.

The input prediction layer 202 can receive user behavioral data 210 that includes browsing data 212, location data 214, search data 216, and a number of other types of user data 218. For example, the other types of user data 218 can include social media account data. The search data 216 can include an internet search history. The behavioral data 210 can be obtained from a number of different data sources to provide multiple data points for determining whether the user poses a potential cyber-threat to the entity. Thus, in some examples, the behavioral data 210 can include user browsing habits, daily activities, internet searches, a job role and activities, access and authorization data, social media accounts and posts, etc. Each of the ML models 208-208Y of the input prediction layer 202 can receive respective data of the user behavioral data 210, as shown in FIG. 2. Each of the ML models 208-208Y of the input prediction layer 202 can process the respective data to provide local prediction data.

In some examples, the local prediction data can be a value (e.g., a decimal, a fraction, or an integer value), or a percentage, and the value or percentage can indicate whether the user poses a potential cyber-threat to the entity. For example, a first ML model 208 of the input prediction layer 202 can provide browser prediction data 220 based on the browsing data 212 for the user. The browser prediction data 220 can indicate whether the user poses a potential cyber-threat to the entity based on user browser information and/or predict browser habits of the user based on the browsing data 212 for the user. A second ML model 208 of the input prediction layer 202 can provide location prediction data 222 based on the location data 214 for the user. The location prediction data 222 can indicate whether the user poses a potential cyber-threat to the entity based on user location information and/or predict location changes of the user. A third ML model 208 of the input prediction layer 202 can provide search prediction data 224 based on the search data 216 for the user. The search prediction data 224 can indicate whether the user poses a potential cyber-threat to the entity based on user search information and/or predict internet searches of the user. The ML model 208Y of the input prediction layer 202 can provide other prediction data 226 based on the other user data 218 for the user. As an example, if the other user data 218 is social media accounts data for the user, the ML model 208Y of the input prediction layer 202 can predict a social activity of the user based on the social media accounts data. The social media accounts data can indicate whether the user poses a potential cyber-threat to the entity based on user social media activities and/or predict a social activity of the user.

As illustrated in FIG. 2, the threat prediction engine 200 also includes a K number of aggregators 228-228K, wherein K is an integer value greater than or equal to one (1). In some examples, the aggregators 228-228K can correspond to or be implemented similar to the aggregators 114-114K, as shown in FIG. 1. Each aggregator 228-228K can aggregated outputs from ML models 208-208Y from an upstream prediction layer and provide an aggregated local prediction to each ML model 208-208Y of a downstream prediction layer. For example, a first aggregator of the aggregators 228-228K can aggregates the browser prediction 220, the location prediction 222, the search prediction 224, and the other prediction 226 to provide the aggregated local prediction. The aggregated local prediction can be used by the ML models 208-208Y of a subsequent intermediary prediction layer of the intermediary prediction layers 204-204N to provide local predictions. These local predictions can be further processed by a downstream aggregator to provide a downstream aggregated local prediction, which can be further provided to a further downstream intermediary prediction layer of the intermediary prediction layers 204-204N for processing. A final aggregator of the aggregators 228-228K, such as the aggregator 228K, can provide a final aggregated local prediction, which can be received by the output prediction layer 206.

The output prediction layer 206 can include an output ML module 230. The output ML module 118 can be implemented as classifier. The output ML module 230 can be trained (e.g., by a trainer 314, as shown in FIG. 3) to determine whether the user poses a potential cyber-threat to the entity based on the final aggregated location prediction. The output ML module 230 can provide potential threat data 232 indicating that the user poses a potential cyber-threat to the entity in response to making such a determination. The potential threat data 232 can be used, as described herein, for mitigating the cyber-threat posed by the user. For example, a cyber-threat monitoring system, as described herein, can employ the potential threat data 232 to disable or lock out a user of one or more entity systems and thereby mitigate the cyber-threat that the user poses to the entity. Because the threat prediction engine 200 is a multi-layered ML algorithm an overall predicted outcome (e.g., the potential threat data 232) provided by the output ML model 230 is influenced by each upstream prediction layer of the multi-layered ML algorithm. Thus, each prediction layer of the multi-layered ML algorithm contributes to the overall predicted outcome as multiple data points are considered by the multi-layered ML algorithm, while processing a number of predictions through the multi-layered ML algorithm to provide an overall predicted outcome.

FIG. 3 is an example of a cyber-threat monitoring system 300 that can be used for detecting and mitigating cybersecurity threats. The cyber-threat monitoring system 300 can be implemented as part of an entity cybersecurity system or architecture (e.g., hardware and/or software architecture) that is used for cyber-threat detection and/or protection. For example, the entity cybersecurity system can include an application, a device, an apparatus, a network (e.g., a local area network (LAN), or a wide area network (WAN)), a computer, a portable device, or an information technology (IT) system. Examples of cybersecurity can include critical infrastructure security, application security, network security, cloud security, internet of things (IoT) security, endpoint security, and/or a different type of measure or practice that is implemented to protect the entity against unauthorized use of entity data and/or entity systems, for example, applications, servers, devices, and/or computers.

With respect to the example of FIG. 3, the cyber-threat monitoring system 300 includes a decision engine 302. The decision engine 302 can be implemented using one or more modules, shown in block form in the drawings. The one or more modules can be in software or hardware form, or a combination thereof. In some examples the decision engine 302 can be implemented as machine readable instructions that can be stored in memory, such as a memory 304, as shown in FIG. 3. A processor 306 can access the memory 304 and execute the machine readable instructions to implement at least some of the functions, as described herein. By way of example, the memory 304 can be implemented, for example, as a non-transitory computer storage medium, such as volatile memory (e.g., random access memory (RAM), such as DRAM), non-volatile memory (e.g., a hard disk drive, a solid-state drive, a flash memory, or the like), or a combination thereof. The processor 306 can be implemented, for example, as one or more processor cores.

The processor 306 can execute the machine readable instructions representative of the decision engine 302 to predict whether the entity is vulnerable to an internal or external cyber-threat, and aid in a decision process for mitigating the cyber-threat. Example of threats can include ransomware attacks, malware attacks, fileless attacks, phishing attacks, man-in-the-middle attacks, malicious applications, denial of service attacks, zero-day exploit attacks, Domain Name Service (DNS) tunneling, DNS spoofing, structured query language injection, jailbreaking and rooting, operating system exploits, etc. A system that is identified by the decision engine 302 as posing a potential cyber-threat to the entity can be referred to herein as a detected system. The detected system can include a device, a computer (e.g., stationary or portable, such as a laptop), a portable device (e.g., a tablet, a mobile phone, etc.), a network, an apparatus, and/or an application. In some instances, as described herein, the decision engine 302 can disable or cause the detected system to be disabled to mitigate or eliminate the cyber-threat posed by the detected system to the entity.

The detected device can include any type of device that can support storage, such as computers, servers, personal digital assistants (PDAs), cellular telephones, tablets, smart phones, fax machines, printers, copiers, gaming consoles, application-specific devices). The detected network can include a corporate network, an enterprise network, or a different type of network. The detected application can include a mobile application, a server-side application, a device application, a database application, a system software application, a business application, a customer relationship management application, an enterprise resource planning application, a project management application, a business process management application, a custom developed application, a productivity application, a time management application, a resource management, a web browser application, a presentation application, a spreadsheet application, a graphics application, a word processor application, a multimedia application, an education, information application, a content access application, a shareware application, a simulation application, an open source application, and a closed source application), and/or the like.

The decision engine 302 includes a prediction engine 308. The prediction engine 308 can be implemented similar to the prediction engine 100, as shown in FIG. 1, or in some examples, similar to the prediction engine 200, as shown in FIG. 2. Thus, reference can be made to FIGS. 1-2 in the example of FIG. 3. The prediction engine 308 can be trained to provide prediction data 310 based on input data 312. In some examples, the input data 312 includes the input data 110-110M, as shown in FIG. 1, or the behavioral data 210, as shown in FIG. 2. By way of further example, the input data 312 can include user behavior data, network traffic data, application behavior data, device behavior data, and/or computer behavior data. In some instances, the prediction data 310 can include the predicted outcome 120, as shown in FIG. 1, or the potential threat data 232, as shown in FIG. 2. The prediction data 310 can indicate that the detected system poses potentially a cyber-threat to the entity. The prediction data 310 can identify in some instances a user of the detected system, and/or a system type (e.g., whether the detected system is an application, a mobile device, etc.).

In some examples, a trainer 314 can be used to train the prediction engine 308. The trainer 314 can employ one or more ML algorithms (e.g., a supervised, semi-supervised, unsupervised, and/or reinforced algorithms) to train ML models of the prediction engine 308 based on training data 316. The training data 316 can characterize previous or historical user behavior data, network traffic data, application behavior data, device behavior data, and/or computer behavior data that has been determined (e.g., by another system, or a subject matter expert) as acceptable and/or unacceptable for the entity or entity system. In some examples, the decision engine 302 includes the trainer 314 and/or the training database 316. The trainer 314 can be implemented in software or hardware form, or a combination thereof.

The decision engine 302 includes an interface 318. The interface 318 in some instances can render the prediction data 310 on an output device 320 to alert personnel (e.g., IT administrators, managers, etc.) that the detected system poses a potential cyber-threat to the entity. As an example, the output device 320 can be a display, a projector, etc. Thus, in some examples, the interface 318 can include a graphical user interface (GUI) generator that can be programmed to render a GUI that includes the prediction data 310 for displaying on the output device 320. By alerting the personnel, the decision engine 302 enables or allows the personnel to investigate whether the detected system, device, network, or application has been compromised.

In some examples, an input device 322 can be used by the personnel to confirm whether the detected system has been compromised, which can correspond to confirming whether the decision engine 302 provided an accurate prediction. User confirmation data can be provided to the decision engine 302 from the input device 322 in response to user input. The decision engine 302 can update one or more ML models of the prediction engine 308 based on the user confirmation data to update and thus improve a prediction accuracy of the prediction engine 308. Thus, the prediction engine 308 can be updated over time to render more accurate predictions, which leads to an improvement in cybersecurity threat detection for the entity.

In some examples, the interface 318 can communicate with the detected system to disable the detected system based on the prediction data 310. Thus, in some instances, the interface 318 can include an application program interface (API). For example, the prediction engine 308 can output a prediction threat value (e.g., a percentage, an integer, etc.) indicative of a likelihood or an amount of threat that the detected system poses to the entity. The interface 318 can compare the prediction threat value to a prediction threat threshold. In response to the prediction threat value being equal to or greater than the prediction threat threshold, the interface 318 can disable the detected system. As an example, the interface 318 can cause the detected system to be denied access to a computer network. Thus, in examples wherein the detected system includes a bot, the bot will be prevented from communicating with a command and control server by the decision engine 302.

In some instances, the interface 318 can provide command data 324, which can be used to disable the detected system. The command data 324 can includes instructions/commands for disabling the detected system. By way of another example, the command data 324 can indicate that detected system should be locked to lock out a user of the detected system until personnel can confirm whether the user poses a threat to the entity (e.g., confirm whether the user is an imposter). The command data 324 can be communicated by the interface 318 with instructions that change user rights at the detected system to a locked out state. Accordingly, the cyber-threat monitoring system 300 can detect internal and external cyber-threats to data and systems of the entity, and mitigate such threats in some instances without human or user intervention, which can bottleneck a threat mitigation process and lead to loss of data, in some instances, to human life. Furthermore, while examples are presented herein for detecting and mitigating cyber-threats for an entity, in other examples, the cyber-threat monitoring system 300 can be used to reduce or eliminate cyber-threats posed to non-entities, such as a consumer (e.g., a consumer's personal network).

Figure 4:
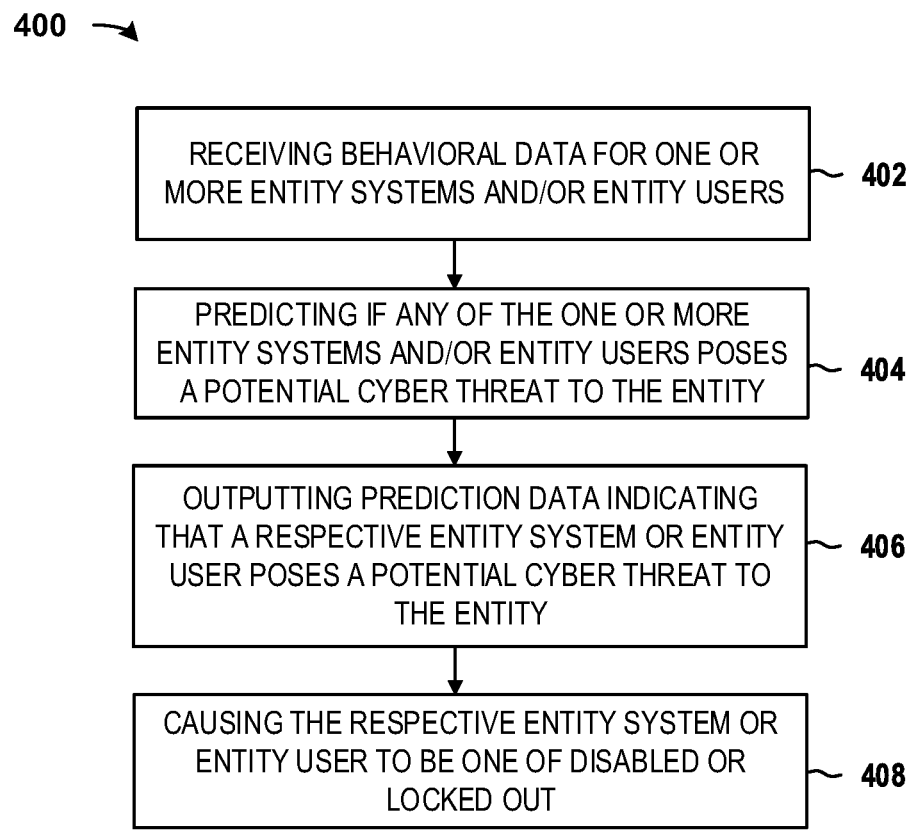
FIG. 4 is an example of a method for detecting and mitigating a cyber-threat.

In view of the foregoing structural and functional features described above, an example method will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

FIG. 4 is an example of a method 400 for detecting and mitigating entity cyber-threats. The method 400 can be implemented by the decision engine 302, as shown in FIG. 3. Thus, reference can be made to the example of FIGS. 1-3 in the example of FIG. 4. The method 400 can begin at 402 by receiving (e.g., at the prediction engine 308, as shown in FIG. 3) behavioral data (e.g., the behavioral data 210, as shown in FIG. 2, or the input data 312, as shown in FIG. 3) characterizing a behavior of one or more entity systems and/or an entity users of an entity. The behavioral data can include, for example, user behavior data, network traffic data, application behavior data, device behavior data, and/or computer behavior data.

At 404, predicting, using a prediction engine (e.g., the prediction engine 308) having multiple prediction layers, whether any of the one or more entity systems or the entity users poses a potential cyber-threat to the entity. Each layer of the multiple prediction layers can include a number of ML models that contribute to an overall prediction of the prediction engine in predicting that the respective entity system or entity user potentially poses a cyber-threat to the entity. At 406, outputting (e.g., at the prediction engine 308) prediction data 310 indicating that a respective entity system or entity system user potentially poses a cyber-threat to the entity. At 408, causing the respective entity system or entity user to be one of disabled or locked out to mitigate or eliminate the cyber-threat posed by the respective entity system or entity user.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 5. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 5:
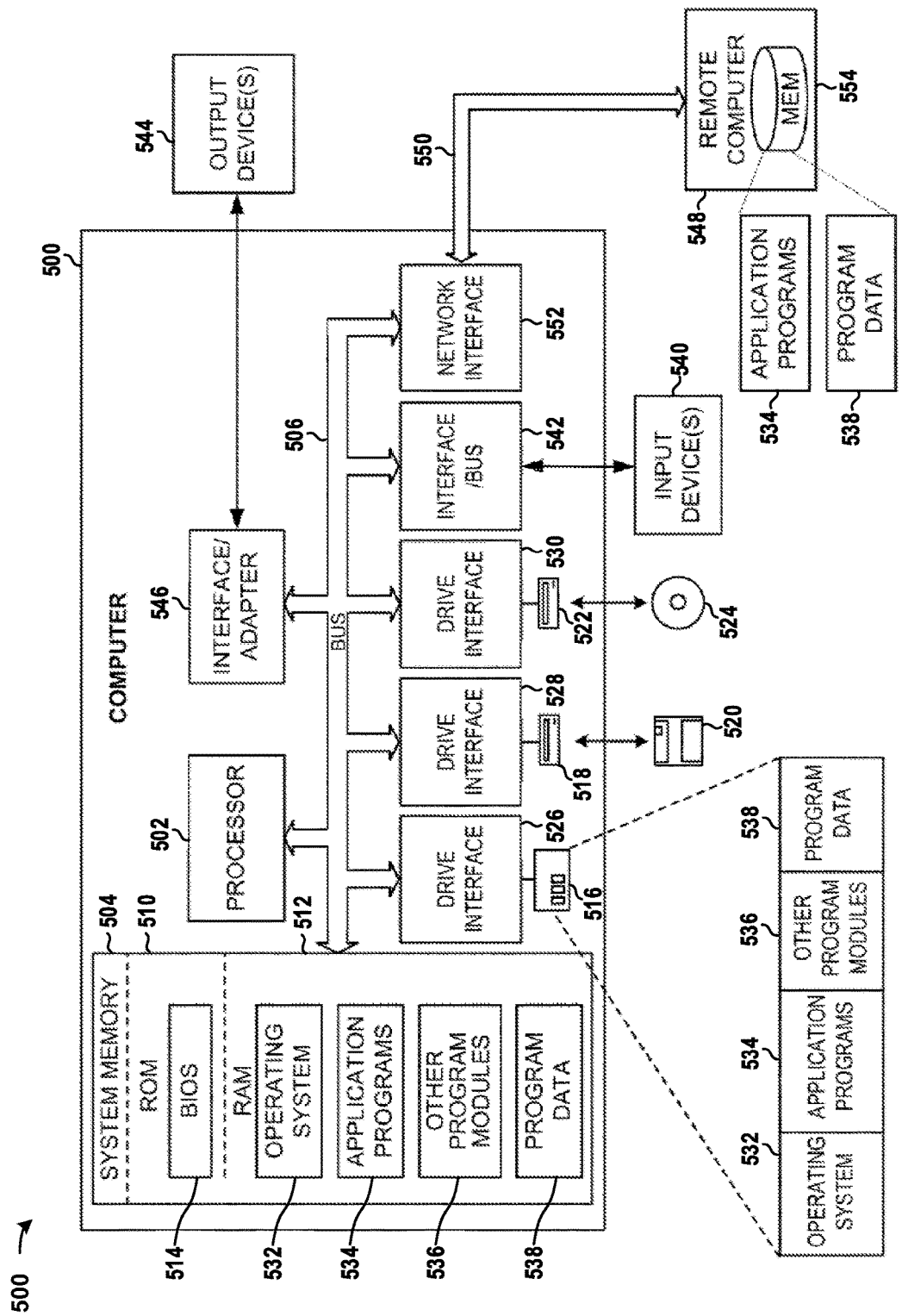
FIG. 5 depicts an example computing environment that can be used to perform methods according to an aspect of the present disclosure.

In this regard, FIG. 5 illustrates one example of a computer system 500 that can be employed to execute one or more embodiments of the present disclosure. Computer system 500 can be implemented on one or more general purpose networked computer systems, embedded computer systems, routers, switches, server devices, client devices, various intermediate devices/nodes or standalone computer systems. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. Dual microprocessors and other multiprocessor architectures also can be used as processing unit 502. System bus 506 may be any of several types of bus structure including a memory bus or memory controller, a peripheral bus, and a local bus using any of a variety of bus architectures. System memory 504 includes read only memory (ROM) 510 and random access memory (RAM) 512. A basic input/output system (BIOS) 514 can reside in ROM 510 containing the basic routines that help to transfer information among elements within computer system 500.

Computer system 500 can include a hard disk drive 516, magnetic disk drive 518, e.g., to read from or write to removable disk 520, and an optical disk drive 422, e.g., for reading CD-ROM disk 524 or to read from or write to other optical media. Hard disk drive 416, magnetic disk drive 518, and optical disk drive 522 are connected to system bus 506 by a hard disk drive interface 526, a magnetic disk drive interface 528, and an optical drive interface 530, respectively. The drives and associated computer-readable media provide nonvolatile storage of data, data structures, and computer-executable instructions for computer system 500. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 510, including operating system 532, one or more application programs 534, other program modules 536, and program data 538. In some examples, the application programs 534 can include a prediction engine (e.g., the prediction engine 100, as shown in FIG. 1, the prediction engine 200, as shown in FIG. 2, or the prediction engine 308, as shown in FIG. 3) and/or a decision engine (e.g., the decision engine 302, as shown in FIG. 3). The program data 538 can include at least some or all of the data as described herein and shown in FIGS. 1-3. A user may enter commands and information into computer system 500 through one or more input devices 540, such as a pointing device (e.g., a mouse, touch screen), keyboard, microphone, joystick, game pad, scanner, and the like. These and other input devices 540 are often connected to processing unit 502 through a corresponding port interface 542 that is coupled to the system bus, but may be connected by other interfaces, such as a parallel port, serial port, or universal serial bus (USB). One or more output devices 544 (e.g., display, a monitor, printer, projector, or other type of displaying device) is also connected to system bus 506 via interface 546, such as a video adapter.

Computer system 500 may operate in a networked environment using logical connections to one or more remote computers, such as remote computer 548. Remote computer 548 may be a workstation, computer system, router, peer device, or other common network node, and typically includes many or all the elements described relative to computer system 500. The logical connections, schematically indicated at 550, can include a LAN and a WAN. When used in a LAN networking environment, computer system 400 can be connected to the local network through a network interface or adapter 552. When used in a WAN networking environment, computer system 400 can include a modem, or can be connected to a communications server on the LAN. The modem, which may be internal or external, can be connected to system bus 506 via an appropriate port interface. In a networked environment, application programs 534 or program data 538 depicted relative to computer system 500, or portions thereof, may be stored in a remote memory storage device 554.

The invention claimed is:

1. A computer-implemented method comprising:
receiving, at a prediction engine, behavioral data characterizing a behavior of system users of a system from a plurality of data sources;
predicting, at the prediction engine, whether a given system user is a cyber-threat based on the behavioral data, wherein the prediction engine further comprises:
multiple prediction layers that each include a number of machine learning (ML) models that contribute to an overall prediction of whether any of the system users is the cyber-threat, wherein the multiple prediction layers comprise;
an input prediction layer that includes a first set of ML models that receive behavioral data from a first data source and a second set of ML models that receives behavioral data from a second data source, wherein each of the ML models of the input prediction layer generates a different type of local prediction of behavior of the system user in response to receiving behavioral data;
an output prediction layer that includes a classifier ML model; and
outputting, by the output prediction layer at the prediction engine, prediction data classifying a respective system user as the cyber-threat for use in mitigating or eliminating the cyber-threat posed by the respective system user based on the local predictions.

2. The computer-implemented method of claim 1, further comprising causing the system user to be locked out from one of the one or more systems to mitigate or eliminate the cyber-threat posed by the respective system user.

3. The computer-implemented method of claim 2, wherein the behavioral data includes a combination of types of input data including user behavior data, network traffic data, application behavior data, device behavior data, and computer behavior data, wherein the input prediction layer includes a specific ML model for each type of input data.

4. The computer-implemented method of claim 3, wherein the prediction engine includes an aggregator, and the multiple prediction layers include an intermediary prediction layer, the method further comprising:
receiving, at the aggregator, local predictions from a given set of ML Models from the input prediction layer; and
aggregating, at the aggregator, the received predictions to provide an aggregated prediction that influences a prediction of a set of ML models of the intermediary prediction layer.

5. The computer-implemented method of claim 4, wherein the aggregator is a first aggregator, and the prediction engine includes aggregators including the first aggregator, the predictions are first predictions, the aggregated prediction is a first aggregated prediction, and the multiple prediction layers include an output prediction layer, the method further comprising:
receiving, at the given set of ML models of the intermediary prediction layer, the first aggregated prediction to provide second predictions; and
aggregating, at a second aggregator of the aggregators, the second predictions to provide a second aggregated prediction that influences a prediction of a ML model of the output prediction layer.

6. The computer-implemented method of claim 5, further comprising generating, at the ML model of the output prediction layer, a predicted outcome indicating that the system user is a potential cyber-threat, wherein the prediction data is generated based on the predicted outcome.

7. The computer-implemented method of claim 6, further comprising:
generating command data comprising instructions for disabling the system of the system user; and
providing the command data to the system to disable the system to mitigate or eliminate the cyber-threat posed by the system.

8. The computer-implemented method of claim 7, wherein the system is one of a computer, an application, a server, a mobile device, a portable device, and/or a network.

9. The computer-implemented method of claim 6, wherein the behavioral data is a first set of behavioral data, and the method further comprising providing a second set of behavioral data to at least one ML model of the set of ML models of the intermediary prediction layer, wherein the at least one ML model is to provide a respective second prediction further based on the second set of behavioral data.

10. The computer-implemented method of claim 9, wherein the input prediction layer and the intermediary prediction layer comprise a similar amount of ML models.

11. The computer-implemented method of claim 10, wherein at least one ML model of the set of ML models of the input prediction layer is a different type of ML model than at least one of the set of ML models of the intermediary prediction layer.

12. The computer-implemented method of claim 1, wherein at least one of the first set of ML models receives browsing data from the first data source and provides a first local prediction of browsing data for the system user, and at least one of the second set of ML models receives location data from the second data source and provides a prediction of location changes for the system user.

13. A system comprising:
memory to store machine-readable instructions comprising a prediction engine, the prediction engine comprising an input prediction layer, an intermediary prediction layer, an output prediction layer, and aggregators, each of the input prediction layer and the intermediary prediction layer comprising machine learning (ML) models, and the output prediction layer comprising a respective ML model;
one or more processors to access the memory and execute the machine-readable instructions to:
receive, at each ML model of the ML models of the input prediction layer, respective input data from a different data source of data sources to provide respective first predictions, wherein each different data source provides a different type of data;
aggregate, at a first aggregator of the aggregators, the respective first predictions to provide a first aggregated prediction, wherein the aggregators provide a data structure including received predictions, such that the first aggregated prediction is a first data structure including the respective first predictions;
receive, at each ML model of the ML models of the intermediate prediction layer, the first aggregated prediction to provide respective second predictions;
aggregate, at a second aggregator of the aggregators, the respective second predictions to provide a second aggregated prediction;
receive, at the respective ML model of the output prediction layer, the second aggregated prediction to provide a predicted outcome; and
cause the predicted outcome to being used in a system to influence a decision process of the system.

14. The system of claim 13, wherein the system is one of a server, a computer, an application, a mobile device, or a portable device.

15. The system of claim 13, wherein the system is a cyber-threat monitoring system, and the predicted outcome is an indication that a system user of the system or the system is a cyber-threat.

16. The system of claim 11, wherein the machine readable instructions further comprise a decision engine that is programmed to cause the respective system to be disabled or the system user to be locked out from the system to mitigate or eliminate the cyber-threat.

* * * * *